(12) United States Patent
Tiesler et al.

(10) Patent No.: US 7,073,930 B2
(45) Date of Patent: Jul. 11, 2006

(54) AIMABLE VEHICLE LAMP ASSEMBLY

(75) Inventors: John Marstan Tiesler, Harrison Township, MI (US); Shu-Hsiung Chou, Rochester Hills, MI (US); Christopher Paul Pattitoni, Northville, MI (US)

(73) Assignee: Lear Corporation, Southfield, MI (US)

( * ) Notice: Subject to any disclaimer, the term of this patent is extended or adjusted under 35 U.S.C. 154(b) by 86 days.

(21) Appl. No.: 10/931,347

(22) Filed: Sep. 1, 2004

(65) Prior Publication Data

US 2006/0044802 A1 Mar. 2, 2006

(51) Int. Cl.
*F21V 19/02* (2006.01)

(52) U.S. Cl. .................................... 362/528

(58) Field of Classification Search ............ 362/523, 362/528, 529, 530, 418, 421
See application file for complete search history.

(56) References Cited

U.S. PATENT DOCUMENTS

| 4,298,912 | A | * | 11/1981 | Dearth ...................... 362/490 |
|---|---|---|---|---|
| 5,307,246 | A | | 4/1994 | Schmid et al. |
| 5,582,474 | A | | 12/1996 | Van Order et al. |
| 5,908,239 | A | | 6/1999 | Sugimoto |
| 5,938,321 | A | * | 8/1999 | Bos et al. .................... 362/494 |
| 6,015,219 | A | | 1/2000 | Kelly |
| 6,015,222 | A | | 1/2000 | Schindler |
| 6,155,700 | A | | 12/2000 | Hsu |
| 6,283,621 | B1 | | 9/2001 | Macri |
| 6,471,378 | B1 | | 10/2002 | Ziegerer et al. |
| 6,550,948 | B1 | | 4/2003 | Filbrun et al. |
| 2004/0017687 | A1 | | 1/2004 | Misaras |

* cited by examiner

*Primary Examiner*—Renee Luebke
*Assistant Examiner*—Julie A. Shallenberger
(74) *Attorney, Agent, or Firm*—Wildman, Harrold, Allen & Dixon LLP

(57) ABSTRACT

An aimable lamp assembly is provided having a bezel, with an opening, in which the bezel is secured to a backplate. A housing assembly having a front housing and a back housing is disposed between the backplate and the bezel. A light source is disposed within the housing assembly. The back housing is connected to the backplate through a ball and a socket joint and the front housing partially protrudes through the opening in the bezel.

20 Claims, 2 Drawing Sheets

AIMABLE VEHICLE LAMP ASSEMBLY

BACKGROUND OF THE INVENTION

1. Field of the Invention

The invention relates generally to vehicle lamp assemblies, and in particular, to vehicle lamp assemblies that are aimable to position the lamp to provide illumination in a designated area.

2. Background Art

Automotive vehicles use fixed and aimable lamp assemblies to provide light within the interior of a vehicle. Conventional aimable lamps have used a trim bezel assembly which requires a significant number of components resulting in increased packaging space requirements and increased costs. In such aimable lamps, two piece trim bezels have been employed to contain the swivel motion. Some conventional assemblies move a lens about a fixed light source location also requiring a number of components to provide swivel action.

Additionally, conventional headlamps for a vehicle have employed a mechanism for tilting a reflector. The mechanism is positioned in front of a lamp housing and has been used to aim light coming from the vehicle head lamps. Multiple ball and socket members may be used in such assemblies which allow the reflector to move relative to the headlamp housing. An example mechanism used for vehicle headlamps is described and shown in U.S. Pat. No. 5,908,239.

SUMMARY OF THE INVENTION

An aimable lamp assembly is provided having a bezel, with an opening, in which the bezel is secured to a backplate. A housing assembly having a front housing and a back housing is disposed between the backplate and the bezel. A light source is disposed within the housing assembly. The back housing is connected to the backplate through a ball and a socket assembly and the front housing partially protrudes through the opening in the bezel.

An alternative aimable lamp assembly is also provided employing a housing assembly having a front housing and a back housing that is secured to the front housing. A light source is disposed within the housing assembly and a ball and socket assembly is connected to the back housing such that the housing assembly is pivotally movable about the ball and socket assembly.

DETAILED DESCRIPTION

Figure 1:
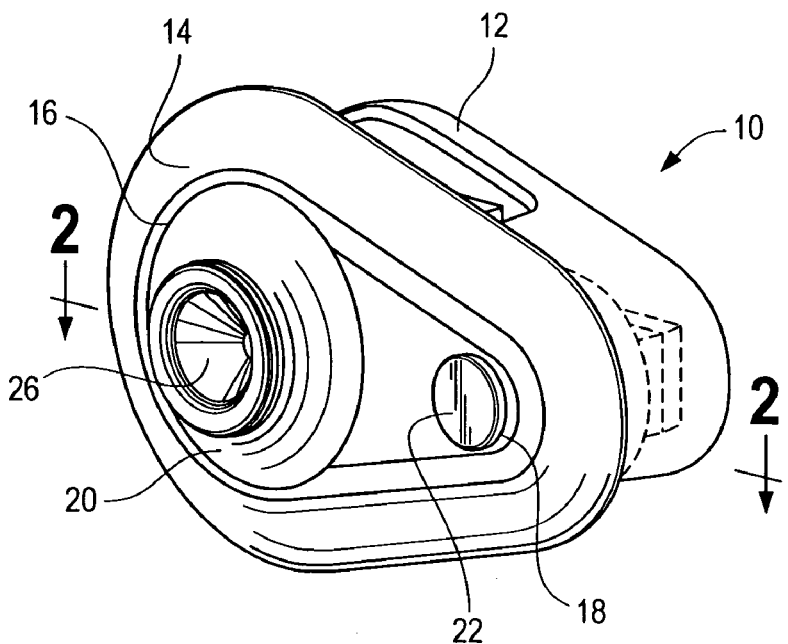
FIG. 1 is a perspective view of an aimable vehicle lamp assembly.

Referring to FIG. 1, an aimable lamp assembly 10 is shown having a backplate 12 which is secured to a front bezel 14. The bezel 14 is a single piece bezel and has a pair of openings 16, 18. A front housing 20 of the aimable lamp assembly 10 partially protrudes through opening 16 of the single piece bezel 14 and a push button 22 of a switch assembly 24 (FIG. 2) partially protrudes through the other opening 18 extending through the bezel. The front housing 20, in this example, has a generally arched shape with a conical opening 26 through a central portion of the front housing to channel light emitted from the lamp assembly 10. Actuation of the push button 22 causes a light source electrically coupled with the switch assembly 24 to turn on, allowing light to be emitted through the conical opening 26. Subsequent actuation of the push button 22 of the switch assembly 24 will turn off the light source housed within the aimable lamp assembly 10. The front housing 20 is selectively movable within bezel opening 16 to position and aim light emitting from the conical opening 26 of the front housing and provide illumination in a designated area.

Figure 2:
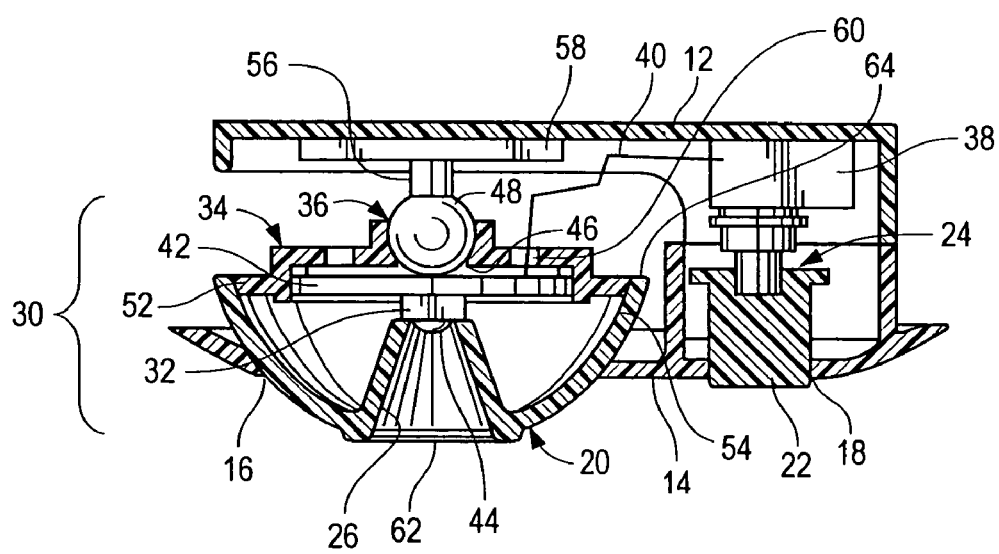
FIG. 2 is a cross-sectional view of the aimable vehicle lamp assembly of FIG. 1 taken along line 2—2.
Figure 3:
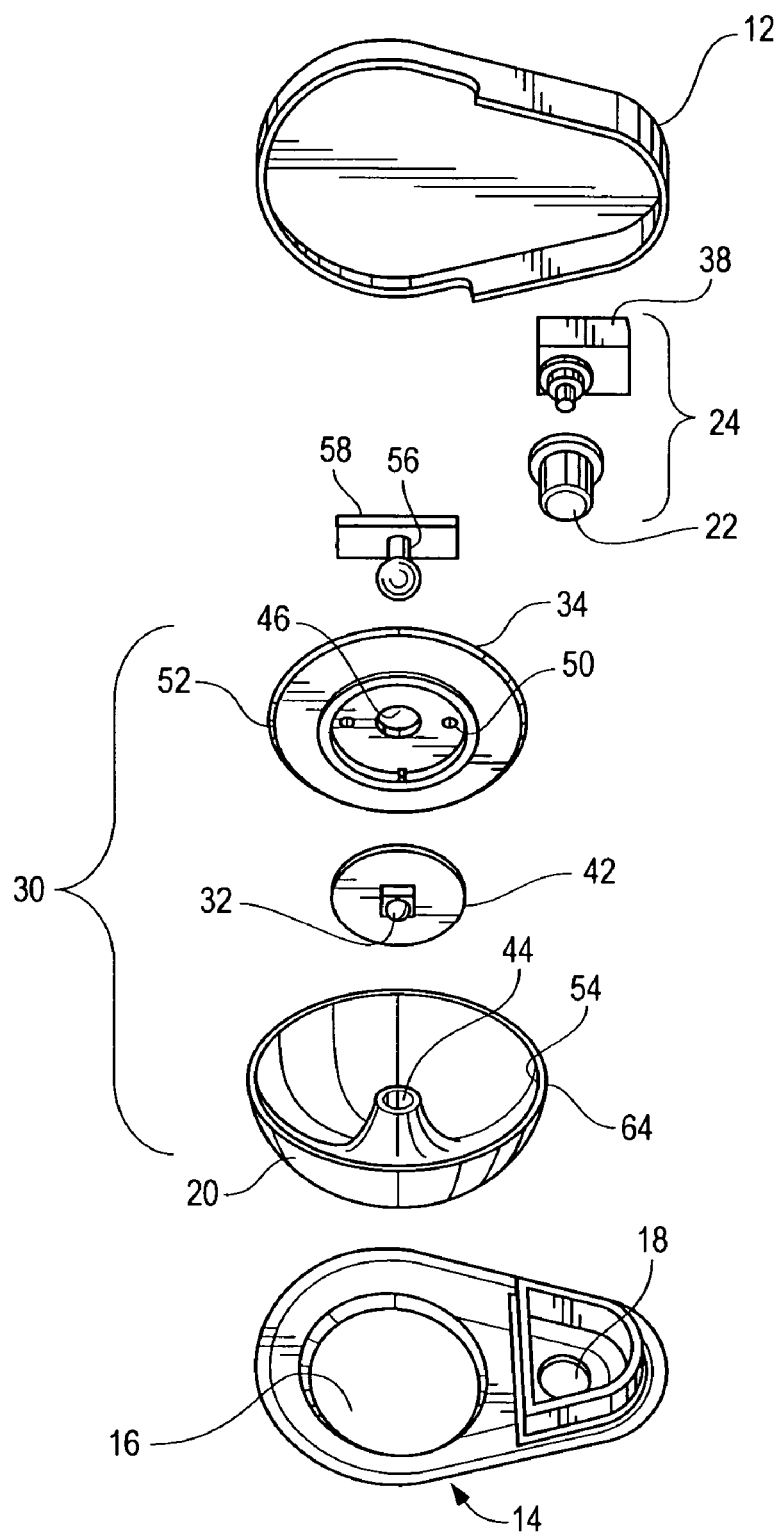
FIG. 3 is an exploded view of the aimable vehicle lamp assembly of FIG. 1.

Referring now to FIGS. 2 and 3, the aimable lamp assembly 10 has housing assembly 30 which contains light source 32 disposed therein. The housing assembly 30 is disposed between bezel 14 and backplate 12 and includes front housing 20 and back housing 34. The back housing 34 is connected to the backplate 12 through a ball and socket assembly 36 and the front housing 20 partially extends through opening 16 of the single piece bezel 14. In this example, the light source 32 may selectively be a light emitting diode (LED). Switch assembly 24 having push button 22 and switch unit 38 is disposed between the backplate 12 and the bezel 14. The switch assembly 24 is electrically coupled to the LED 32 by electrical wiring 40 or other suitable electrical coupling members extending through the ball and socket assembly 36.

As seen in FIGS. 2 and 3, the LED 32 is positioned between the generally eye-ball shaped front housing 20 and the back housing 34 that connects with the ball and socket assembly 36. An LED board member 42 is coupled to the LED 32 in which electrical coupling members 40 (e.g. electrical wires) extending from the switch unit 38 are coupled with the board member 42. A front portion of the LED 32 is positioned proximate a narrow end 44 of the conical opening 26 and a back portion of the LED 32 and the LED board member 42 are positioned to be held by the back housing 34. In this example, the back housing is a retainer member 34 having a socket 46 which engages a ball member 48 of the ball and socket assembly 36. The LED board member 42 is seated within a generally circular seat 50 surrounding the socket 46 of the retainer member 34. An outer rim 52 of the retainer member 34 is generally circular in shape and is formed to fit within an interior portion 54 of the front housing 20 such that the LED 32 and LED board 42 are contained between the front housing and the back housing. The outer rim 52 snaps into, or alternatively may be plastic welded with, the interior portion 54 of the front housing 20.

The ball and socket assembly 36, as seen in FIGS. 2 and 3, has a post 56 which extends from the ball member 48. A backing member 58 is secured to the post 56 and provides a foundation for connection with the backplate 12. A bore 60 extends through retainer member 34 to permit an electrical coupling member 40 (e.g. electrical wiring) to extend from the switch unit 38 of switch assembly 24 through the bore 60 for communication with LED board member 42. Wiring 40 for the LED circuit board 42 may selectively run along the side of the ball member 48. LED 32 is attachably mounted to LED circuit board 42 which has circuitry for regulating voltage. Wiring 40 from the board member 42 extends through bore 60 of retainer member 34 for connection with the switch unit 38. When the LED 32 is turned on, light is emitted proximate the narrow end 44 of the conical opening 26 and is channeled through to the wide end 62 of the conical opening of the front housing 20. The LED 32 may selectively operate at preset beam angles with the conical opening following the preset angle. In this arrangement, the housing assembly 30 is pivotal about the ball and socket assembly 36 to allow light exiting the conical opening 26 to be selectively aimed, for example, within the interior of a vehicle. The opening 16 through the bezel 14 stabilizes the swivel motion of the housing assembly 30 within the bezel. The front housing 20 is pivotal about the ball and socket assembly 36 such that the front housing is positionable from a moveable position where it is free to move about the ball and socket assembly, to a blocked position in which an edge 64 of the front housing 20 is placed into contact with the backplate 12. In this instance, the backplate 12 prevents the front housing 20 from being positioned beyond a desired range of movement and allows the light to be aimed within a designated area of coverage.

The foregoing description of the various embodiments of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:

1. An aimable lamp assembly, comprising:
  a backplate;
  a bezel, having an opening therein, secured to the backplate;
  a housing assembly, disposed between the backplate and the bezel, the housing assembly having a front housing and a back housing, the back housing connected to the backplate through a ball and socket assembly and the front housing partially protruding through the opening in the bezel; and
  a light source disposed within the housing assembly.

2. The aimable lamp assembly of claim 1 wherein the light source is a light emitting diode.

3. The aimable lamp assembly of claim 2 further comprising a switch assembly electrically coupled to the light emitting diode.

4. The aimable lamp assembly of claim 3 wherein:
  the bezel has a second opening therethrough; and
  the switch assembly is disposed between the backplate and the bezel and partially protrudes through the second opening in the bezel.

5. The aimable lamp assembly of claim 4 wherein the bezel is a single piece bezel.

6. The aimable lamp assembly of claim 2 wherein the back housing further comprises a retainer member having a socket which engages a ball member of the ball and socket assembly.

7. The aimable lamp assembly of claim 6 further comprising a board member coupled with the light emitting diode wherein the board member is seated within the retainer member.

8. The aimable lamp assembly of claim 7 wherein the ball and socket assembly further comprises a post extending from the ball member and a backing member secured to the post which is connected with the backplate.

9. The aimable lamp assembly of claim 8 further comprising a bore through the retainer member to permit an electrical coupling member to extend from a switch assembly through the bore for communication with the board member coupled to the light emitting diode.

10. The aimable lamp assembly of claim 6 wherein the front housing further comprises a conical opening which extends from a narrow end positioned proximate the light emitting diode to a wide end.

11. The aimable lamp assembly of claim 1 wherein the housing assembly is pivotal about the ball and socket assembly.

12. The aimable lamp assembly of claim 11 wherein the front housing is pivotal about the ball and socket assembly such that it is positionable from a movable position to a blocked position in which an edge of the front housing is placed into contact with the backplate.

13. An aimable lamp assembly, comprising:
  a housing assembly having a front housing and a back housing secured to the front housing;
  a light source disposed within the housing assembly; and
  a ball and socket assembly connecting the back housing to a backplate such that the housing assembly is pivotally movable about the ball and socket assembly.

14. The aimable lamp assembly of claim 13 wherein the light source is a light emitting diode.

15. The aimable lamp assembly of claim 14 further comprising a switch assembly electrically connected to the light emitting diode.

16. The aimable lamp assembly of claim 15 further comprising a bezel secured to the backplate in which the front housing partially protrudes through an opening in the bezel.

17. The aimable lamp assembly of claim 16 wherein the switch assembly is disposed between the backplate and the bezel and partially protrudes through a second opening in the bezel.

18. The aimable lamp assembly of claim 15 wherein the back housing further comprises a retainer member having a socket which engages a ball member of the ball and socket assembly.

19. The aimable lamp assembly of claim 18 wherein the ball and socket assembly further comprises a post extending from the ball member and wherein a backing member is attached to the post and is securable to the interior of a vehicle.

20. The aimable lamp assembly of claim 18 further comprising a board member coupled with the light emitting diode wherein the board member has an outer rim that engages an interior of the front housing.

* * * * *